(No Model.) 2 Sheets—Sheet 1.
T. TAYLOR.
FREEZING MICROTOME.
No. 256,173. Patented Apr. 11, 1882.
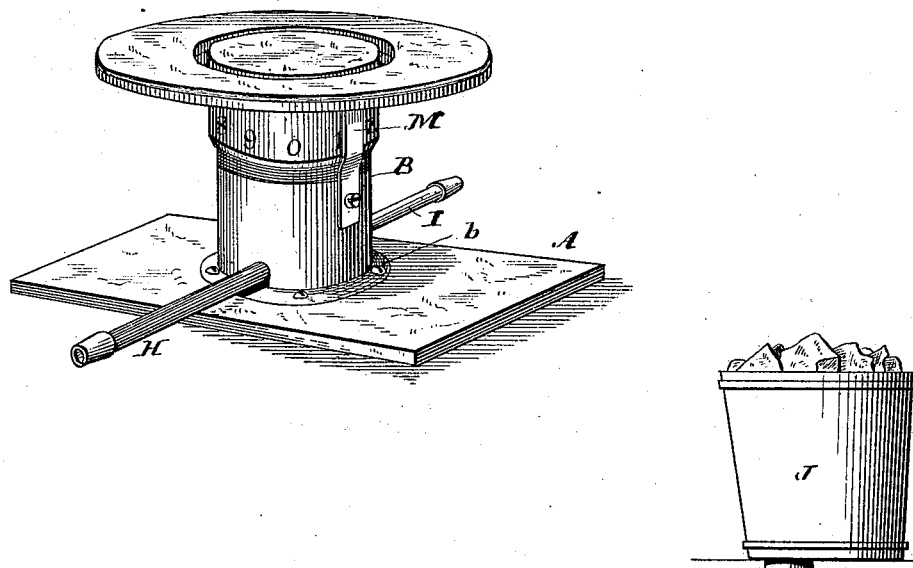
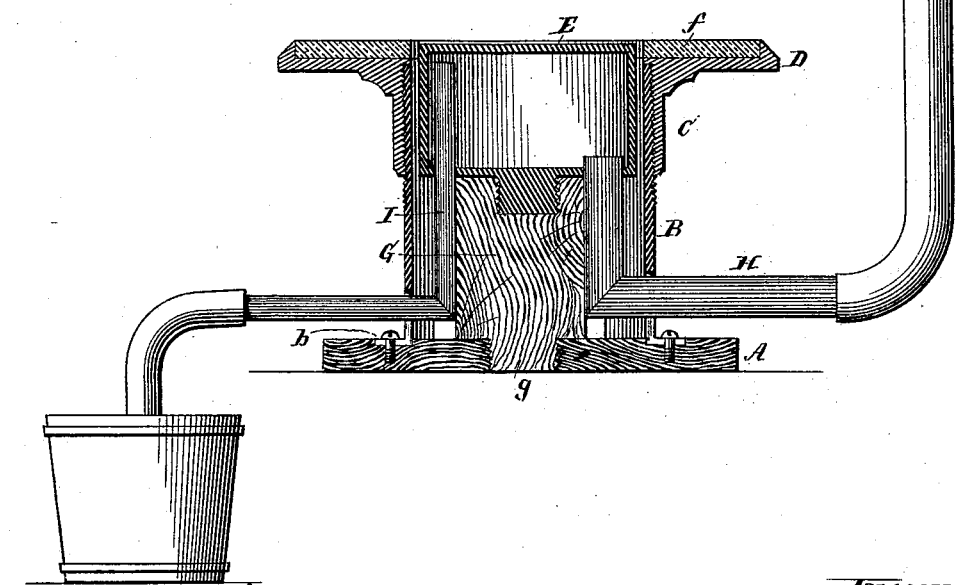
Witnesses:
A. M. Long.
A. M. Tanner.
Inventor.
Thomas Taylor.
By Paine, Crofton & Ladd,
Attorneys.
N. PETERS. Photo-Lithographer, Washington, D. C.

(No Model.) 2 Sheets—Sheet 2.

T. TAYLOR.
FREEZING MICROTOME.

No. 256,173. Patented Apr. 11, 1882.

Witnesses:
A. M. Long,
A. M. Tanner

Inventor.
Thomas Taylor.
By Paine, Grafton & Ladd,
Attorneys.

UNITED STATES PATENT OFFICE.

THOMAS TAYLOR, OF WASHINGTON, DISTRICT OF COLUMBIA.

FREEZING-MICROTOME.

SPECIFICATION forming part of Letters Patent No. 256,173, dated April 11, 1882.

Application filed October 18, 1881. (No model.)

*To all whom it may concern:*

Be it known that I, THOMAS TAYLOR, a citizen of the United States, residing at Washington, in the District of Columbia, have invented certain new and useful Improvements in Freezing-Microtomes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of the present invention is to enable persons skilled in histology and pathology to freeze small portions of animal and vegetable tissue or other soft bodies, so that very thin sections may be cut with a suitable knife. Several devices have been used for this purpose, and ether and other gaseous substances blown or injected into a small cylinder to freeze tissue placed on the outer surface of the cylinder, the evaporation of the ether or other like substance producing cold by evaporating from the under surface on which the tissue is made to rest.

The devices heretofore devised for the object stated are complicated and expensive, and do not give general satisfactory results, chiefly for the reason that they fail to produce sufficient cold. Moreover, certain parts of the device or apparatus that should be inactive elements serve as conductors of cold and lessen the degree of cold that should exist in the freezing-chamber for measuring an expeditious and perfect freezing of the tissue resting on said chamber. In my improved microtome I make use of a mixture of salt and water, and pass the liquid formed by the union and dissolution of salt and ice, which in temperature is about at zero, into a small cylinder for producing an intense degree of cold therein. Tissues placed on the top of the cylinder become sufficiently hard in a comparatively brief period of time to be cut into thin slices or sections by using a suitable knife, the thickness of the section cut being regulated or determined by means of an annular plate which surrounds the freezing-chamber, and is capable of receiving a vertical adjustment in relation thereto for the object just stated.

Figure 3:
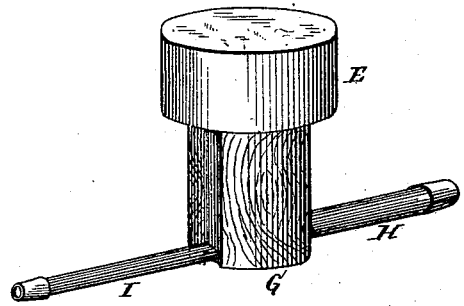
Figure 4:
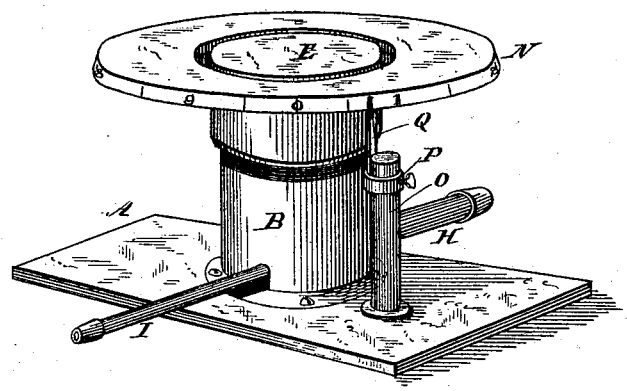

In the accompanying drawings, Figure 1 is a perspective view of a freezing-microtome constructed according to my invention. Fig. 2 is a vertical sectional view of the same. Fig. 3 is a detail view of the freezing-chamber and its non-conducting support, having the inlet and outlet tubes for the freezing medium let into the latter. Fig. 4 is a perspective view of a modified form of a microtome, in which the adjustable plate surrounding the freezing-chamber is provided with an inclined downwardly-projecting flange having a graduated scale, and used in connection with an adjustable pointer fitted on a post rising from a base-plate.

The letter A designates a base-plate, of wood or other suitable material, which supports the various parts of my improved microtome. A metallic shell or casing, B, made of a cylindrical form, has a perforated bottom flange, $b$, for attaching it to the base-plate by means of wood-screws or other fastening devices. The upper portion of the vertical shell B is provided with an external screw-thread of a very fine pitch, and has fitted thereon a sleeve or collar, C, which is constructed or provided with a horizontal top plate or disk, D. The aforesaid collar is constructed with an internal thread corresponding with the screw-thread of the shell B, so as to permit it to be adjusted vertically on said shell. A groove in the upper surface of the plate D surrounds or borders an opening made in said plate, and receives a piece of glass, $f$, as is clearly shown in Fig. 2.

A hollow cylinder, E, closed at the top and bottom and approximating a pill-box form, has a bottom screw-neck, F, for attaching it to a solid plug or block, G. The latter is made of some good non-conducting material, preferably wood, and serves as a non-conducting support interposed between the cylinder E and base-plate A.

The plug G is generally provided with a screw-threaded neck, $g$, which enters a threaded opening in the base-plate; but it may be secured to the latter by any other approved fastening device.

The cylinder E, which may be termed the "freezing-chamber," is provided with two tubes, H I, of varying diameters. The larger tube H serves for the introduction of the freezing-liquid into the cylinder or chamber E, and the tube I, made smaller in diameter than the tube H and terminating near the top plate or head of the cylinder, serves to permit the escape of air from the cylinder when the liquid is introduced, and finally acts as an overflow or discharge pipe for said liquid.

J represents a pail supported on a bracket located at any convenient distance above the freezing-microtome, in which pail is placed a mixture of common salt (chloride of sodium) and finely-divided ice. When the mixture dissolves a liquid solution of salt and water forms in the pail, which passes from it to the cylinder E through the tube H, and is discharged into said cylinder in an upward direction. The outlet-tube I being smaller than the inlet-tube H, it necessarily follows that the freezing-liquid is caused to flow out of the cylinder less rapidly than into it, and as said inlet-tube terminates so near to the head of the cylinder, it will be manifest that an air-space cannot exist above the level of the liquid in the cylinder.

The lower end of the discharge-tube, or, rather, a flexible hose connected therewith, may terminate in a nozzle having a contracted discharge end, in which event both the inlet and outlet tubes can be made of the same, or nearly the same, diameter, as the contracted nozzle will serve to prevent a too rapid discharge of the liquid.

In practice I keep up the flow of freezing-mixture by returning the same to the supply or feeding pail, this operation being continued until the ice in the top pail is wholly dissolved.

As shown in Fig. 1, the sleeve or collar C is provided with a graduated scale or index, which, in connection with a pointer, M, on the shell or casing B, serves to indicate the position or height of the top plate, D, in relation to the upper surface of the freezing-chamber. I contemplate, however, to use, instead of the graduated sleeve, a top plate having an inclined downwardly-projecting flange, N, graduated or bearing an index in the same manner as the sleeve. This modification is illustrated in Fig. 4, in which O represents a post rising from the base-plate, and P a collar adjustably fitted on said post and bearing pointer Q, that can be brought opposite the index-flange or moved below the same. The pointer is moved below the index-flange, so as not to injure or interfere with the movement of the knife used in cutting the substance placed on the freezing-chamber.

A microtome constructed according to my invention is also available for freezing tissue by means of ether or rhigolene by conducting the gaseous freezing medium into the cylinder through the pipe I, and permitting the condensed ether or other agent to flow out through the tube H.

Having thus described my invention, what I claim, and desire to secure by Letters Patent, is—

1. In a freezing-microtome, the combination of a stationary freezing chamber or cylinder and a vertically-adjustable plate surrounding the same, with a suitable base or support, and means for conducting a freezing medium into and out of the freezing chamber, substantially as herein set forth.

2. In a freezing-microtome, the combination of a stationary non-conducting plug and a freezing-chamber supported thereon, with a base-plate and vertically-adjustable plate surrounding the freezing-chamber, substantially as and for the purpose set forth.

3. The combination of the vertical shell or cylinder, having an external screw-thread, and the internally-threaded sleeve or collar, having a top plate or disk adjustably fitted on said shell, with the freezing-chamber surrounded by said top plate, as and for the purpose set forth.

4. The combination of the inlet-tube H and outlet-tube I, having an upwardly-turned end terminating above the inlet-tube, with the freezing-chamber of a microtome, as and for the purpose set forth.

5. The method of producing cold in a microtome by admitting a freezing-solution of salt and water into the same, as and for the purpose set forth.

In testimony whereof I affix my signature in presence of two witnesses.

THOMAS TAYLOR.

Witnesses:
W. B. T. KEYSER,
EUGENE D. CARUSI.